US006452706B1

(12) United States Patent
Iida et al.

(10) Patent No.: US 6,452,706 B1
(45) Date of Patent: Sep. 17, 2002

(54) FM SIGNAL OPTICAL TRANSMISSION APPARATUS AND FM SIGNAL OPTICAL RECEPTION APPARATUS

(75) Inventors: Masanori Iida, Katano (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/237,889

(22) Filed: Jan. 27, 1999

(30) Foreign Application Priority Data

| Jan. 27, 1998 | (JP) | 10-014517 |
| Mar. 13, 1998 | (JP) | 10-062783 |
| Aug. 26, 1998 | (JP) | 10-240086 |

(51) Int. Cl.[7] .............................................. H04B 10/00
(52) U.S. Cl. ........................ 359/161; 359/161; 359/173; 359/181; 359/182; 359/188; 359/195
(58) Field of Search ........................ 359/161, 173, 359/182, 188, 195, 181

(56) References Cited

U.S. PATENT DOCUMENTS

| 4,622,681 A | * 11/1986 | Snall et al. | 375/48 |
| 4,956,719 A | * 9/1990 | Yamashita | 358/310 |
| 5,808,770 A | * 9/1998 | Chen et al. | 359/182 |
| 6,031,645 A | * 2/2000 | Ichikawa | 359/113 |
| 6,067,177 A | * 5/2000 | Kanazawa | 359/124 |

FOREIGN PATENT DOCUMENTS

JP    2700622    10/1996

OTHER PUBLICATIONS

A Super Wideband Optical FM Modulation Scheme for Video Transmission Systems, pp. 1066–1025/IEEE, vol. 14, No. 6, Aug. 1996.
Optical Video Transmission Equipment Employing Wide-Band Frequency Modulation, pp. 540–546/National Technical Report, vol. 42, No. 5, Oct. 1996 (Abstract).

* cited by examiner

Primary Examiner—Jason Chan
Assistant Examiner—Dzung Tran
(74) Attorney, Agent, or Firm—Smith, Gambrell & Russell, LLP

(57) ABSTRACT

A narrow-band FM modulator 3 provided with an optical transmitter 1 converts a carrier signal having high carrier frequency higher enough than those of a plurality of signals into a narrow-band FM signal by FM-modulating the carrier signal with a small modulation index for substantially generating only a first sideband in accordance with a multiplexed signal generated by subcarrier-multiplexing the signals and a frequency converter 4 converts a narrow-band FM signal into a low-frequency-converted narrow-band FM signal having a frequency lower enough than the carrier frequency. A semiconductor laser 7 converts an optical signal into an FM optical signal by modulating the optical signal in accordance with a low-frequency-converted narrow-band FM signal and transmits the FM optical signal to an optical receiver 2 through an optical-fiber cable 92.

13 Claims, 17 Drawing Sheets

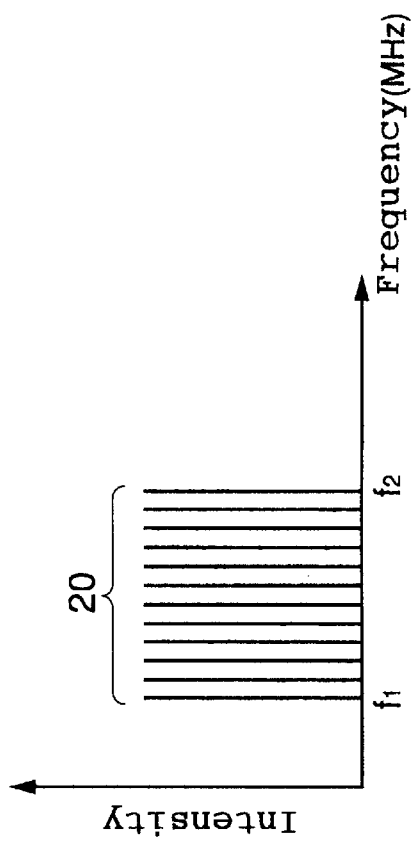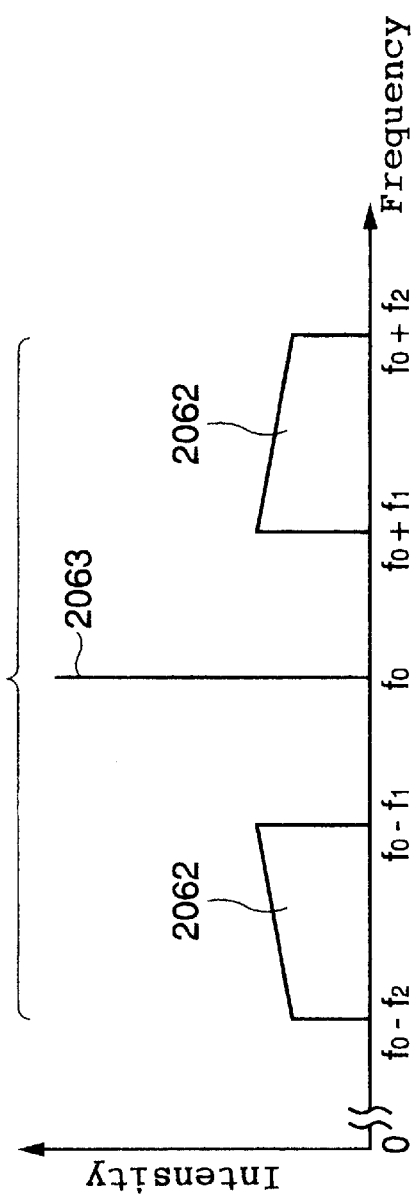
Fig. 11(a)
Fig. 11(b)

FM SIGNAL OPTICAL TRANSMISSION APPARATUS AND FM SIGNAL OPTICAL RECEPTION APPARATUS

BACKGROUND OF THE INVENTION

1. Field of the Invention

The present invention relates to an FM signal optical transmission apparatus and an FM signal optical reception I! apparatus used for, for example, optical communication, CATV, optical measurement, or mobile communication.

2. Description of the Related Art

In recent years, it has been practically used to perform optical transmission of video or audio data for many channels by making the most use of the small loss and wide-band characteristic of an optical fiber for a video monitoring system, CATV, subscriber system, or mobile communication. The above optical transmission system electrically multiplexes signals of many channels by a plurality of subcarriers having frequencies different from each other and converts them into AM signals and then, directly modulates a semiconductor laser beam or the like by the AM signals to convert the semiconductor laser into an optical signal and transmits the optical signal through an optical fiber. Optical transmission of an AM signal is characterized in that the structure of a MODEM can be simplified particularly for transmission of a video signal and the cost of it can be decreased.

However, the above optical transmission system has the following problems. That is, in the case of video optical transmission, it is necessary to secure a high C/N (carrier-to-noise ratio) in order to secure a desired signal characteristic (such as video quality). Moreover, to obtain a high C/N for video optical transmission of an AM signal, the receiver side indispensably requires a high optical input power.

Moreover, in the case of mobile communication, because the intensity level of an audio or data signal to be transmitted is greatly fluctuated due to movement of a terminal, a high dynamic range is necessary for signal fluctuation. Furthermore, mobile communication is subject to a distortion due to a reflected wave at the time of optical conversion by a semiconductor laser or under transmission through an optical fiber. Furthermore, an AM-signal amplifier requires an amplifier having a high linearity.

To solve the above problems and improve the distortion resistance and noise resistance, an optical transmission system has been proposed so far which simultaneously converts subcarrier-multiplexed AM signals into FM signals and optically transmits them. Moreover, to obtain a desired C/N by increasing the modulation index of the proposed optical transmission system, it is also proposed to obtain an FM signal having a high modulation index by directly modulating the frequency of a semiconductor laser. FIG. 17 shows the structure of an optical transmission system improved as described above.

This optical transmission system outputs an optical-frequency modulated signal by directly modulating a semiconductor laser 41 with a multichannel AM signal (e.g. AM video signals) 30 in an AM-to-FM conversion section 82 of an optical transmitter 81. In this case, by modulating the semiconductor laser 41 into the AM signal 30, not only the amplitude of light is modulated but also the oscillation frequency of the light is modulated. By generating the light having an oscillation frequency slightly different from that of the optical-frequency-modulated signal thus generated by a local-oscillation light source 42 and multiplexing the light and the above optical-frequency-modulated signal by a multiplexer 43 and thereafter, inputting the multiplexed light to a photodiode 44 and heterodyne-detecting the light, a wide-band (e.g. 1 to 6GHz) FM-modulated signal is generated as a beat signal of two lasers and output to an electricity-to-light conversion section 83.

The electricity-to-light conversion section 83 inputs the FM-modulated signal to a semiconductor-laser driving amplifier 88, directly modulates a semiconductor laser 89 for transmission in accordance with the output of the semiconductor-laser driving amplifier 88 to generate an FM optical signal, and transmits the FM optical signal to an optical-fiber cable 92. (The above structure is disclosed in, for example, Japan Patent No. 2700622.)

The FM optical signal transmitted to the optical-fiber cable 92 is amplified by an amplifier (not illustrated) set to the middle of the optical-fiber cable 92 or the like and thereafter, optical-fiber-transmitted to each light-receiving section 93 through an optical turnout (not illustrated) set to the middle of the optical-fiber cable 92.

The light-receiving section 93 first converts an FM optical signal into an electric signal and amplifies the electric signal by a light-to-electricity converter 96 and a preamplifier 97 constituting a light-to-electricity conversion section 95 and thereafter, demodulates the electric signal to an AM signal 31 by an FM-to-AM demodulation section 94. The FM-to-AM demodulation section 94 is a delay-type demodulation circuit which is constituted with high-speed logic ICs 51 and 53 (e.g. AND gate), a delay section 52, and a low-pass filter 54 through a limiter amplifier 50 and realizes wide-band demodulation.

In the case of the above conventional FM transmission system, however, when converting an AM video multiplexed signal into an FM optical signal by the semiconductor laser 41, the CNR (carrier-to-noise ratio) is greatly deteriorated because phase noises of the semiconductor layer 41 are added to the FM optical signal. Therefore, even if the light-receiving intensity of the optical receiver 93 is raised, the sensitivity is only improved up to a certain CNR value. To obtain a desired CNR from the optical receiver 93, it is necessary to use a semiconductor laser having a line width of approx. $\frac{1}{10}$ the line width of the above conventional system and a semiconductor laser having an external resonator structure. Therefore, there are problems that these semiconductor lasers are expensive and moreover, a plurality of semiconductor lasers must be used.

Moreover, a method is considered which directly converts an AM signal into an electric FM signal in a low frequency band. However, when increasing the modulation index of an FM modulator (modulation factor $\geq 10\%$), problems occur that a distortion occurs in an FM modulator, the signal quality is deteriorated due to the distortion, and thereby, preferable optical transmission cannot be realized.

Moreover, a conventional optical transmission system has problems that, because of transmitting wide-band FM signals of 1 to 6 GHz, the uniformity of frequency bands of signals is broken due to the delay characteristic of parts of an amplifier in the optical transmitter 81 or those of the optical-fiber cable 92 and a distortion due to a phase delay occurs in the AM signal 31 demodulated by the light-receiving section 93.

The present invention is made to solve the above problems and its object is to provide an FM signal optical transmission apparatus and an FM signal optical reception apparatus having a simple structure, a low cost, and a high reception sensitivity compared to conventional ones.

SUMMARY OF THE INVENTION

The 1st invention of the present invention is an FM signal optical transmission apparatus comprising modulation means for converting a multiple signal obtained by subcarrier-multiplexing a plurality of signals into an FM signal having a predetermined carrier frequency;

frequency conversion means for shifting an FM signal converted by said modulation means to a frequency lower than said carrier frequency; and optical modulation means for converting an optical signal into an FM optical signal by modulating said optical signal in accordance with an FM signal output from said frequency conversion means and transmitting said FM optical signal through an optical fiber cable.

According to the above structure, an optical signal to be transmitted is obtained by performing narrow-band FM modulation and low-frequency conversion, and then intensity modulation. So neither additional circuit nor optical heterodyne detection circuit are necessary. Therefore, the circuit structure is simple compared to a conventional example and superior in stability and reliability. Thus, it is possible to provide an inexpensive FM signal transmission system. Moreover, because of using narrow-band FM signals, modulation distortion hardly occurs in the above modulation means. Therefore, the signal quality is not deteriorated.

The 3rd invention of the present invention is the FM signal optical transmission apparatus according to said 1st invention, further comprising: multiplication means for multiplying a plurality of said FM signals output from said modulation means to output a multiplied signal; and first-band filtering means for band-filtering a desired narrow-band FM signal among multiplied signals output from said multiplication means to output it to said frequency conversion means.

Moreover, according to the above structure, an optical signal to be transmitted is obtained by performing narrow-band FM modulation and low-frequency conversion, and then intensity modulation. Therefore, neither additional circuit nor optical heterodyne detection circuit are necessary. Thus, it is possible to provide an inexpensive FM signal transmission system having a simple circuit structure compared to an conventional example and superior in stability and reliability. Furthermore, because of using narrow-band FM signals, modulation distortion hardly occurs in the above modulation means and thereby, the signal quality is not deteriorated. Furthermore, because of multiplying narrow-band FM signals, it is possible to obtain an FM signal having a large modulation index compared to the case of a conventional example and obtain a desired CNR from an optical receiver.

The 4th invention of the present invention is the FM signal optical transmission apparatus according to said 1st or 3rd invention, further comprising: second-band filtering means for band-filtering only either of a first upper-sideband and a first lower-sideband included in the first sideband of said FM signal output from said modulation means.

Furthermore, according to the above structure, because transmission can be performed at a lower band, it is possible to raise the transmission efficiency and the power consumption for transmission driving is reduced.

The 5th invention of the present invention is the FM signal optical transmission apparatus according to any one of said 1st to 4th inventions, wherein said modulation means is a voltage-control oscillator or relaxation oscillator.

The 6th invention of the present invention is the FM signal optical transmission apparatus according to any one of said 1st to 4th inventions, wherein said modulation means phase-modulates said multiple signal to convert it into a phase-modulated signal and thereafter, multiplexes the phase-modulated signal and said carrier signal and thereby, converts the multiplexed signal into a narrow-band FM signal to output it.

Furthermore, according to the above structure, it is possible to simplify a circuit structure compared to the case of a conventional example and provide an inexpensive system.

The 7th invention of the present invention is the FM signal optical transmission apparatus according to any one of said 1st to 6th inventions, wherein suppression means for suppressing the central frequency of said FM signal output from said modulation means is included, and the output from said suppression means is input to said frequency conversion means to serve as an object of said shifting.

Furthermore, according to the above structure, it is possible to improve the quality of transmission signals compared to the conventional quality though the structure is simple.

The 9th invention of the present invention is the FM signal optical transmission apparatus according to any one of said 1st to 8th inventions, wherein compensation means is included which applies dispersion compensation or group-delay compensation to said FM signal to be transmitted.

Furthermore, according to the above structure, it is possible to inexpensively realize an optical transmission system superior in phase characteristic under transmission.

The 15th invention of the present invention is an FM signal optical reception apparatus comprising compensation means for dispersion-compensating or group-delay-compensating an FM optical signal transmitted through an optical fiber; light-to-electricity conversion means for converting an FM optical signal output from said compensation means into an FM electric signal; and demodulation means for demodulating said FM signal converted by said light-to-electricity conversion means into an AM signal.

Furthermore, according to the above structure, it is possible to inexpensively realize an optical reception system capable of suppressing a distortion due to a phase shift under transmission.

BRIEF DESCRIPTION OF THE DRAWINGS

is an illustration of an FM signal after passing through the FM modulator of the embodiment 3 of the present invention.

FIG. 11(a) is an illustration showing an AM signal to be transmitted of the present invention;

FIG. 11(b) is a spectrum diagram of an FM signal after passing through an AM-to-FM converter;

Figure 1:
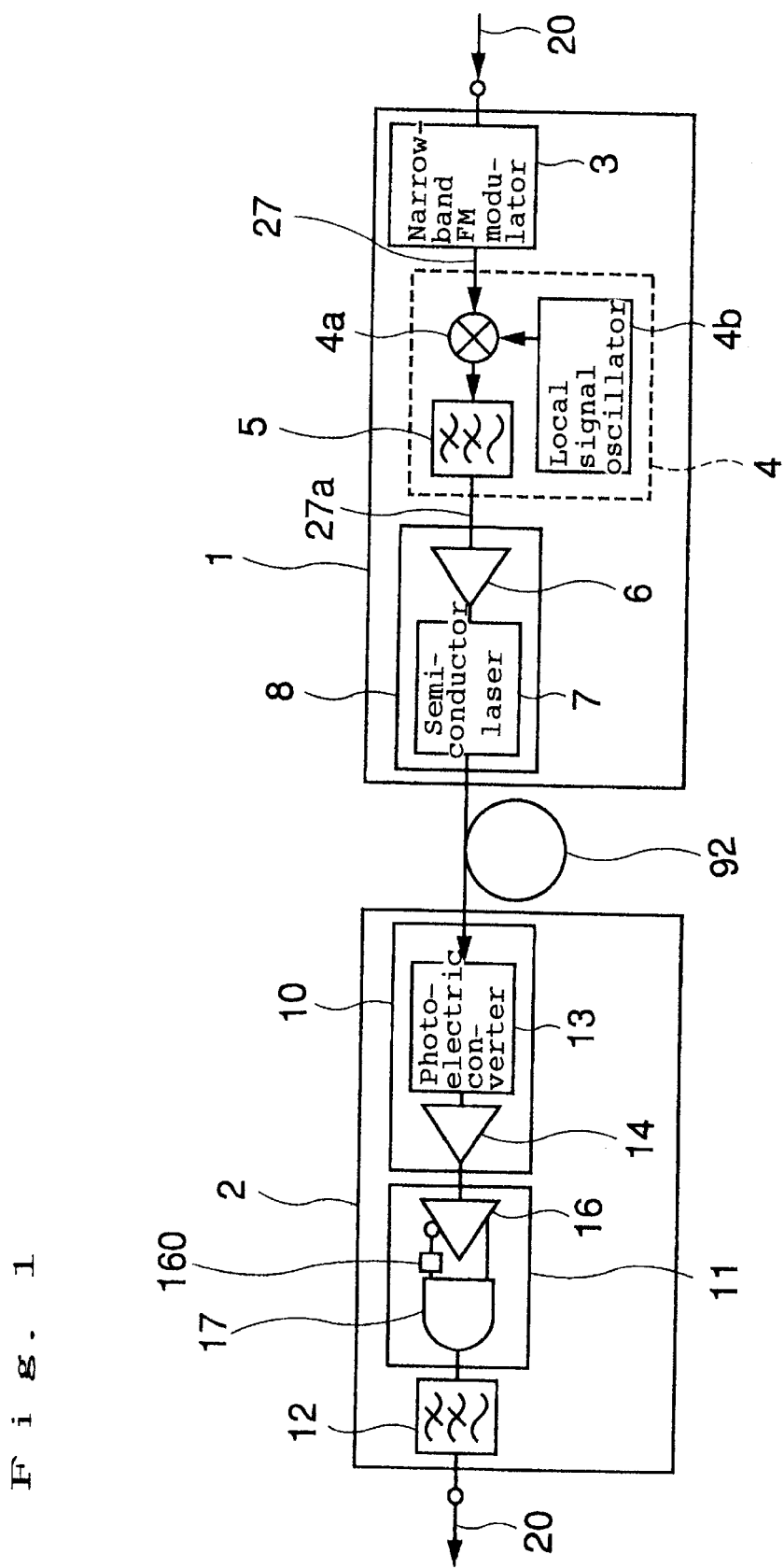
FIG. 1 is a block diagram showing the structure of the FM optical transmission system of the first embodiment of the present invention.

DESCRIPTION OF SYMBOLS 1, 1a . . . Optical transmitter
2 . . . Optical receiver
3 . . . Narrow-band FM modulator
4 . . . Frequency converter
4a . . . Mixer
4b . . . Local signal oscillator
5 . . . Low-pass filter
6 . . . Driving amplifier
7 . . . Semiconductor laser
8 . . . Electricity-to-light conversion section
92 . . . Optical-fiber cable
10 . . . Light-to-electricity conversion section
11 . . . FM demodulator
12 . . . Low-pass filter
13 . . . Photoelectric converter
14 . . . Low-noise amplifier
20, 20a . . . AM-multiplexed video signal
21 . . . Multiplier
22 . . . Band-pass filter
27 . . . Narrow-band FM signal
27a . . . Low-frequency-converted narrow-band FM signal

DETAILED DESCRIPTION OF THE PREFERRED EMBODIMENTS

Embodiments of the present invention are described below by referring to the accompanying drawings.

First Embodiment

FIG. 1 is a block diagram showing the structure of the FM optical transmission system of the first embodiment of the present invention. The FM optical transmission system of this embodiment is constituted with an optical transmitter 1 and an optical receiver 2 connected each other by an optical-fiber cable 92. In this case, the optical transmitter 1 is provided with a narrow-band FM modulator 3, a frequency converter 4, and an electricity-to-light conversion section 8 and the optical receiver 2 is provided with a light-to-electricity conversion section 10, an FM demodulator 11, and a low-pass filter 12.

Figure 2A:
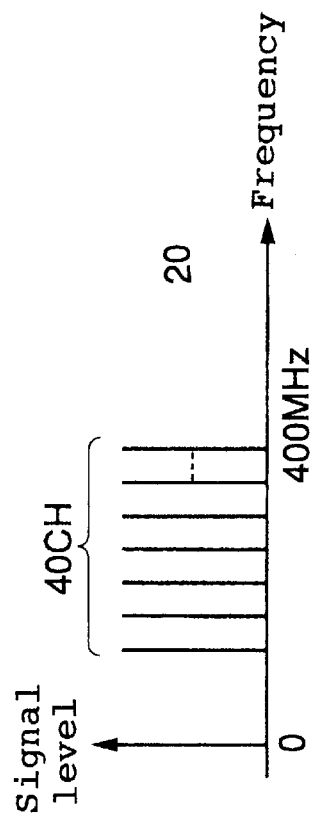
FIG. 2(a) is a spectrum diagram showing the frequency characteristic of an AM-multiplexed video signal 20 that is an input signal of the narrow-band FM modulator 3 in FIG. 1.
Figure 2B:
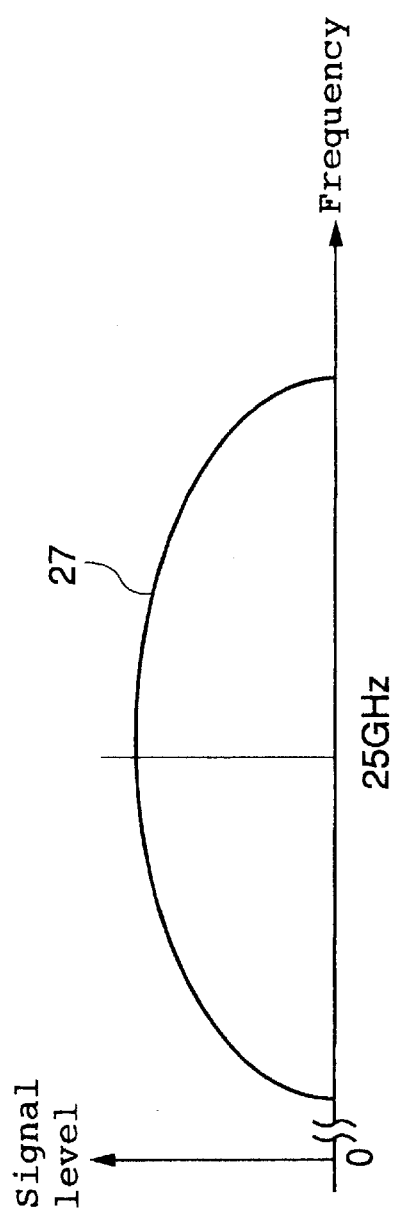
FIG. 2(b) is a spectrum diagram showing the frequency characteristic of a narrow-band FM signal 27 which is an output signal of the narrow-band FM modulator 3 in FIG. 1.
Figure 3:
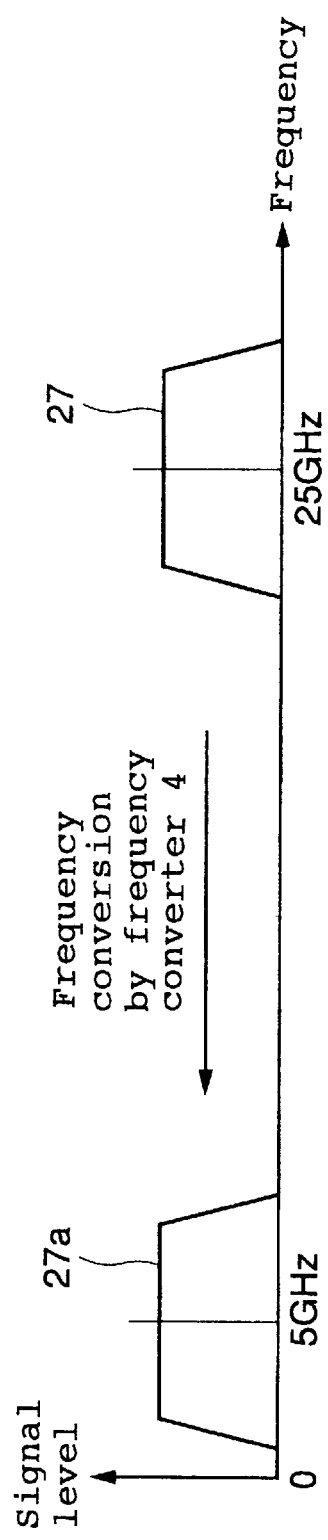
FIG. 3 is a spectrum diagram showing the frequency conversion by the frequency converter 4 in FIG. 1.

In FIG. 1, a signal input to the narrow-band FM modulator 3 is an AM-multiplexed video signal 20 generated by subcarrier-multiplexing a multichannel AM video signal. The narrow-band FM modulator 3 internally generates a high-frequency carrier signal in a millimeter-wave band higher enough than the frequency band of the AM-multiplexed video signal 20, converts the carrier signal into the narrow-band FM signal 27 shown in FIG. 2(b) by frequency-modulating the carrier signal with a relatively-small modulation index (modulation factor corresponding to the modulation index is 10% or less) at which only the carrier and first sideband (first sideband includes a first upper-sideband and a first lower-sideband) of an FM signal are substantially generated in accordance with the input AM-multiplexed video signal 20 and outputs the signal 27 to a mixer 4a of the frequency converter 4. In this case, because the frequency of the carrier signal of the narrow-band FM signal 27 is higher enough than the original input signal, there is an advantage that a large modulation index necessary for optical transmission can be obtained.

The narrow-band FM modulator 3 can use, for example, a voltage-control oscillator using a varactor or a reactance transistor, or a digital relaxation oscillator using a multivibrator. Moreover, it is possible to integrate and thereafter phase-modulate the AM-multiplexed video signal 20. Furthermore, it is possible to multiplex a carrier signal to the above phase-modulated signal by a balanced modulator and thereby generate a narrow-band FM signal.

The narrow-band FM signal 27 output from the narrow-band FM modulator 3 is mixed with a locally-oscillated signal output from a local-signal oscillator 4b by the mixer 4a provided with a nonlinear device such as a pin-type diode having a nonlinear voltage-current characteristic and then, low-frequency-filtered by the low-pass filter 5, and thereby the narrow-band FM signal 27 having a central frequency (carrier frequency) of 25 GHz is down-converted (frequency conversion to lower frequency) into a low-frequency-converted narrow-band FM signal 27a having a central frequency of 5 GHz.

The reason for down-converting the FM signal 27 into the FM signal 27a is described below. That is, the upper limit of frequencies realizing signal conversion between an electric signal and an optical signal is generally restricted by the limit of the frequency response rate of a conversion device. In general, a frequency response cannot be made unless a carrier frequency is 10 GHz or lower or signal conversion cannot be performed. Therefore, the above down-conversion is necessary.

Then, the low-frequency-converted narrow-band FM signal 27a down-converted as described above is amplified by a driving amplifier 6 in an electricity-to-light converter 8 and then, input to a semiconductor laser 7 provided with a laser diode.

The semiconductor laser 7 intensity-converts an optical signal generated inside in accordance with the input lowfrequency-converted narrow-band FM signal and thereby, transmits the intensity-converted optical signal to the counterpart optical receiver 2 through the optical-fiber cable 92.

In this case, the semiconductor laser 7 uses, for example, a large-wavelength semiconductor laser made of an InP-based material having a wavelength in a 1.2- to 1.6-μm band, a semiconductor laser of a 0.78-μm band, or a semiconductor laser made of a GaAlAs-based material having an oscillation wavelength in a 0.98-μm band in a preferable embodiment. Moreover, the optical-fiber cable 92 uses, for example, an optical-fiber cable, a multi-mode optical-fiber cable, or a single-mode optical-fiber cable having a core diameter of 10 to 300 μm in a preferable embodiment.

An optical signal received by the optical receiver 2 through the optical-fiber cable 92 is input to the light-to-electricity conversion section 10 and photoelectrically converted into an electric signal by a photoelectric converter 13 provided with a photodiode or an avalanche photodiode, and then amplified to an electric signal having a desired signal intensity by the low-noise amplifier 14. The amplified electric signal is frequency-demodulated by the FM demodulator 11 and returned to the original AM-multiplexed video signal 20. In this case, it is preferable to use a delay-line-type or pulse-counting-type demodulator having a wide band and a high linearity. FIG. 1 shows a delay-line type demodulator.

In the case of this embodiment, the narrow-band FM modulator 3 obtains the narrow-band FM signal 27 by frequency-modulating a carrier signal with a relatively-small modulation index at which only the carrier and fist sideband of an FM signal are substantially generated. Therefore, the narrow-band FM signal 27 substantially becomes a signal close to an AM signal. Thus, it is possible to use a structure for filtering only either of the first upper-sideband and the first lower-sideband of the narrow-band FM signal 27 with a band-pass filter and transmitting it. In this case, the optical receiver 2 can regenerate the original narrow-band FM signal 27 by passing through an amplitude limiter after photoelectric conversion. Therefore, because transmission can be performed in a narrower band, it is possible to improve the transmission efficiency. Thus, it is possible to reduce the power consumption for transmission driving.

This embodiment uses the delay-line type as shown in FIG. 1 and uses a two-output element 16 serving as a high-speed digital element, an AND element 17, and a delay circuit 160. Moreover, the FM demodulator 13 is not restricted to the above structure. It is also possible to use a double-tuned frequency discriminator, a Foster-Seeley discriminator, or a circuit such as a ratio detector having a frequency-discriminating function.

As described above, because this embodiment obtains an optical signal to be transmitted by narrow-band-FM-modulating and low-frequency-converting the signal and then intensity-modulating the signal by the semiconductor laser 7, neither additional circuit nor optical heterodyne detection circuit are necessary. Therefore, it is possible to provide an inexpensive FM signal transmission system having a simple circuit structure compared to the case of a conventional example, superior in stability and reliability. Moreover, because of using the narrow-band FM signal 27, a modulation distortion hardly occurs in the narrow-band FM modulator 3. Therefore, the signal quality is not deteriorated.

Second Embodiment

Figure 4:
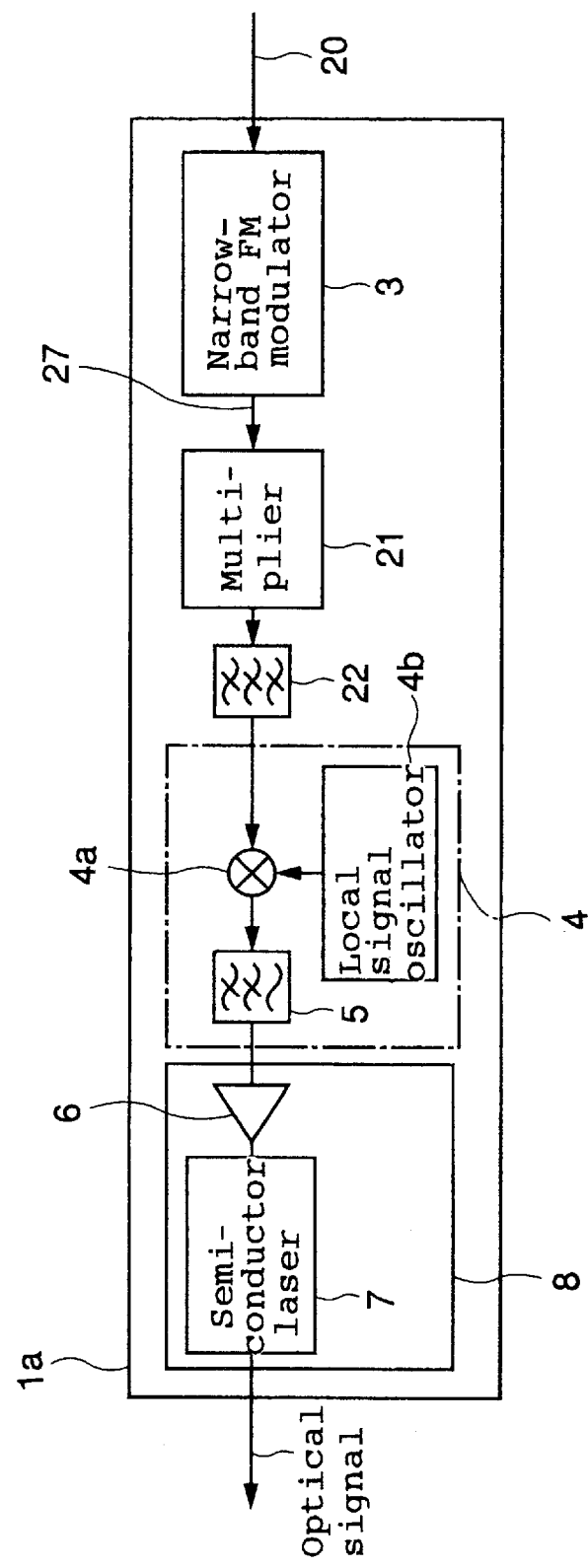
FIG. 4 is a block diagram showing the structure of the optical transmitter 1a of the FM optical transmission system of the second embodiment of the present invention.

FIG. 4 is a block diagram showing the structure of an optical transmitter 1a of the FM optical transmission system of the second embodiment of the present invention. In FIG. 4, a component same as that in FIG. 1 is provided with the same symbol. The optical receiver 2 uses that of the first embodiment. The second embodiment is different from the first embodiment in that a multiplier 21 and a low-pass filter 22 are set between the narrow-band FM modulator 3 and the frequency converter 4 and characterized in that a plurality of the narrow-band FM signals 27 are multiplied by the multiplier 21, and a signal in a desired band is band-filtered by the band-pass filter 22 and thereafter frequency-converted to a lower frequency by the frequency converter 4. Different points from the first embodiment are described below particularly in detail.

In FIG. 4, the AM-multiplexed video signal 20 generated by subcarrier-multiplexing AM video signals of channels is input to the narrow-band FM modulator 3. The narrow-band FM modulator 3 narrow-band-FM-modulates a carrier signal having a carrier frequency ($f_0$=5 GHz) higher than the original AM video signal frequency (approx. 500 MHz) in accordance with the input AM-multiplexed video signal 20 to convert the carrier signal into the narrow-band FM signal 27. The narrow-band FM modulator 3 performs narrow-band FM modulation having a low modulation index at which signal deteriorated due to distortion does not occur or sidebands other than a first sideband dot not remarkably appear in the FM conversion spectrum for each channel of a multichannel subcarrier-multiplexed signal.

Figure 5:
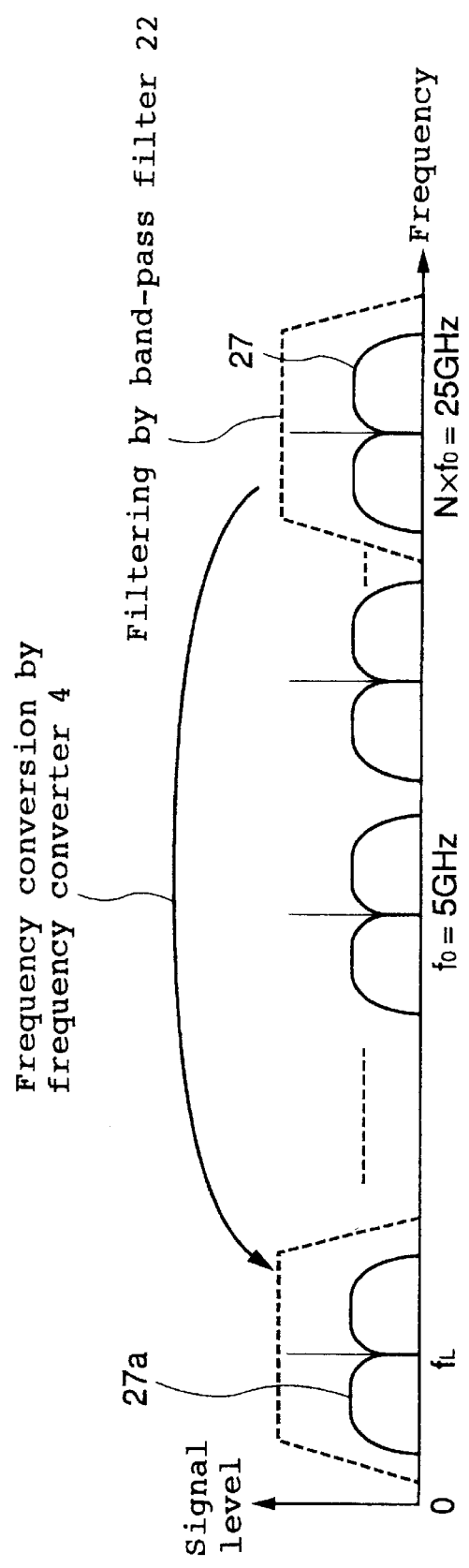
FIG. 5 is a spectrum diagram showing the processing by the optical transmitter 1a in FIG. 4.

A plurality of the narrow-band FM signals 27 are input to the multiplier 21 and multiplied by N to increase the modulation index of the narrow-band FM signal 27. Thereby, the signal 27 is provided with a carrier frequency (25 GHz for multiplication number N=5) higher enough than that of the original AM-multiplexed video signal 20 as shown in FIG. 5 and moreover converted into an FM signal having a wide signal band. Therefore, an FM signal having a modulation index for obtaining a CNR necessary for the optical receiver 2 of the FM optical transmission system can be obtained through the above multiplication.

Then, the FM signal is input to the band-pass filter 22 in which one narrow-band FM signal 27 is extracted so as to eliminate spectrums in unnecessary bands other than the FM signal band, and then down-converted into the low-frequency-converted narrow-band FM signal 27a by the frequency converter 4 as shown in FIG. 5 similarly to the case of the first embodiment. The subsequent processings are the same as the case of the first embodiment.

As described above, this embodiment makes it possible to obtain an FM signal having a large modulation index compared to the case of a conventional example because the narrow-band FM signal 27 is multiplied and moreover obtain a desired CNR by the optical receiver 2.

Thus, even when-the narrow-band FM modulator 3 described for the first embodiment has a structure unable to generate a carrier signal having a frequency higher enough than that of the original AM-multiplexed video signal 20, it shows the same advantage as the first embodiment by adding the multiplier 21 as shown in FIG. 4.

Third Embodiment

Figure 6:
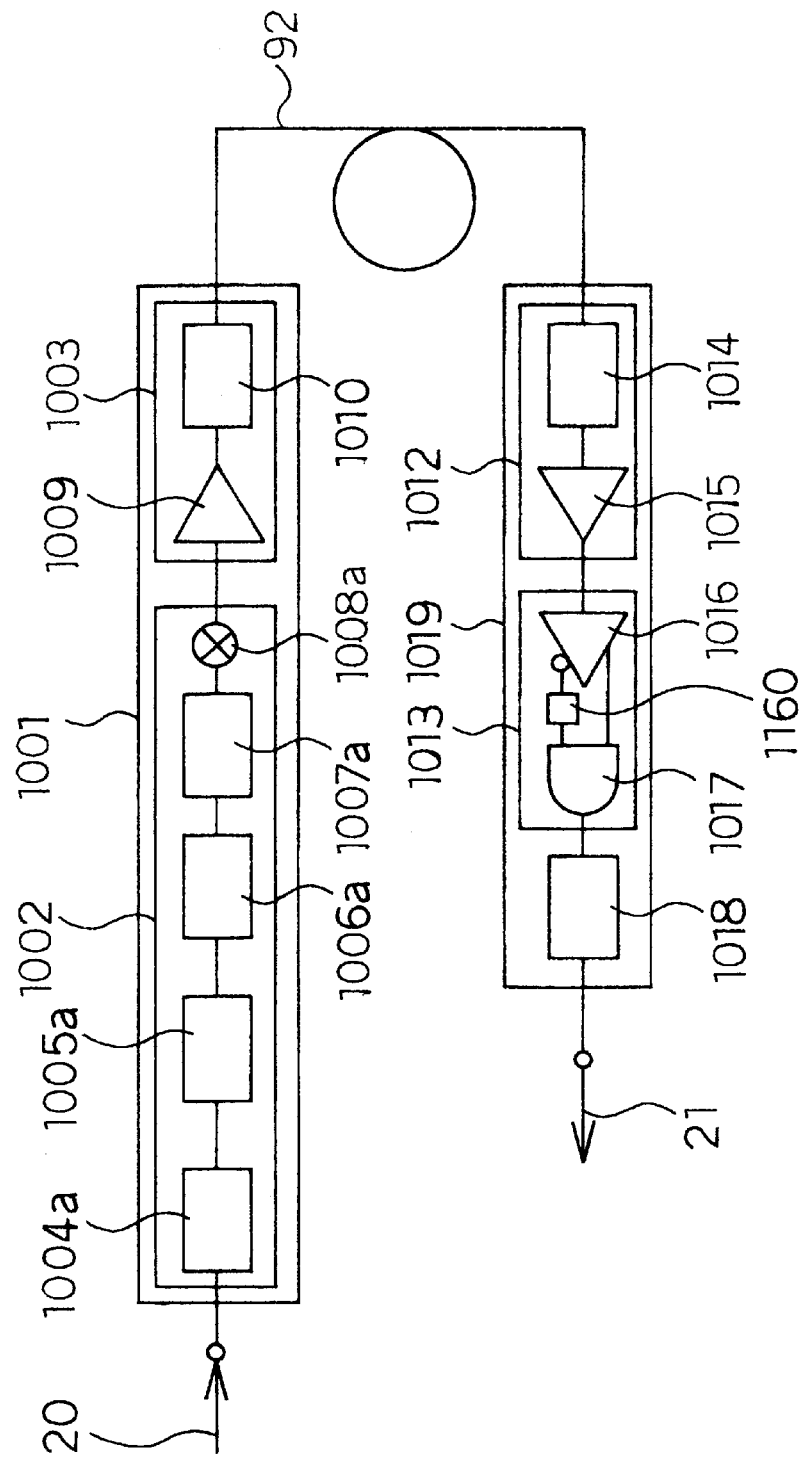
FIG. 6 is a block diagram of the FM signal optical transmission apparatus of the third embodiment of the present invention.

FIG. 6 is a block diagram of the FM optical transmission system of the first embodiment of the present invention. The structure of this embodiment is described below by referring to FIG. 6.

As shown in FIG. 6, the FM optical transmission system is constituted with an optical transmitter 1001 and an optical receiver 1019. The optical transmitter 1001 is constituted with an FM conversion section 1002 including an FM modulator 1004a, a band-elimination filter 1005a, a multiplier 1006a, a band-pass filter 1007, and a frequency converter 1008a and an electricity-to-light conversion section 1003 including a wide-band amplifier 1009 and a semiconductor laser 1010. An optical signal output from the optical transmitter 1001 is transmitted by the optical fiber 92 and input to the optical receiver 1019. The optical receiver 1019 is constituted with a light-to-electricity conversion section 1012 including a light-to-electricity conversion section 1014 and a preamplifier 1015, an FM demodulator 1013, and a filter 1018. Suppression means of the present invention corresponds to the band-elimination filter 1005a.

Operations of this embodiment having the above structure are described below.

Figure 7A:
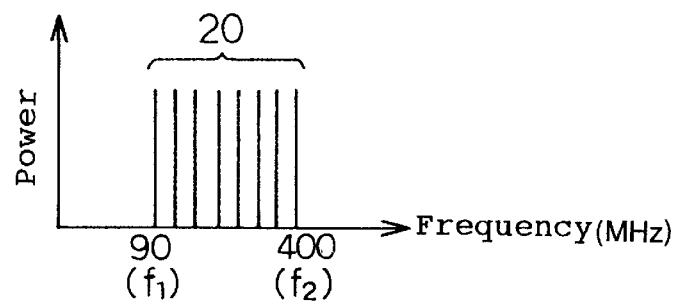
FIG. 7(a) is an illustration of an AM signal transmitted by a conventional example or the present invention, FIG. 7(b)
Figure 7B:
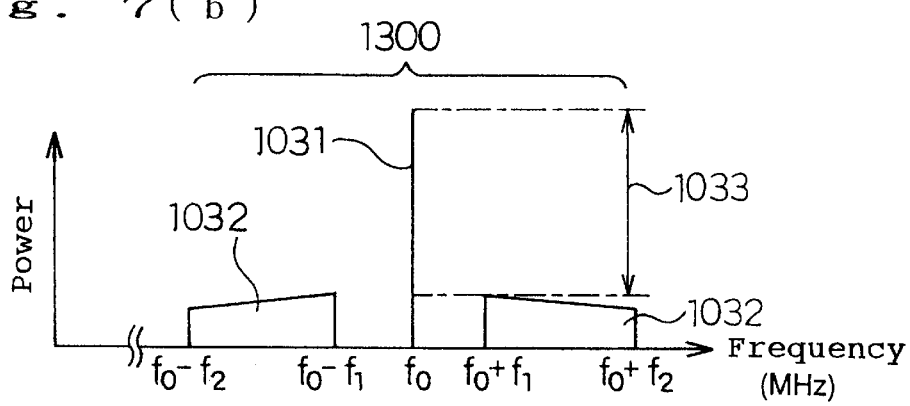
FIG. 7(c) is a spectrum diagram of a signal after passing through the band-elimination filter of the embodiment 3 of the present invention.

That is, the AM signal 20 serving as the multichannel subcarrier-multiplexed video signal shown in FIG. 7(a) is converted into the FM signal 30 shown in FIG. 7(b) by the FM modulator 1004a.

Moreover, the FM modulator 1004a performs narrow-band FM modulation causing no distortion and having a low modulation factor. In this case, the modulation factor has a small value at which sidebands other than a first sideband 1032 do not remarkably appear as the spectrum of an FM-converted signal 1300 for each channel of the multichannel subcarrier-multiplexed signal 20.

Figure 7C:
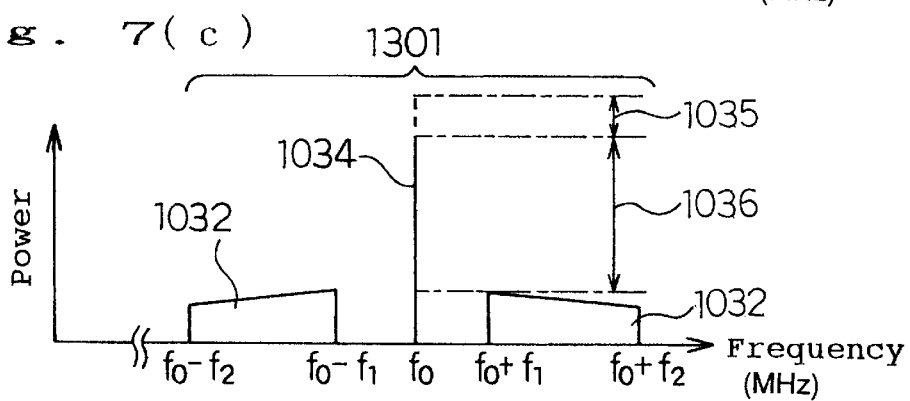

Therefore, each first sideband 1032 in FIG. 7(b) appears in a region $f_1$ separate from an FM carrier 1031 (frequency of $f_0$). FIG. 7(c) shows a signal 1301 after the FM signal 1300 passes through the band-elimination filter 1005a. The central frequency of the band-elimination filter 1005a is adjusted to the frequency $f_0$ of the FM carrier 1031 in FIG. 7(b) and the suppression degree at the central frequency is not large. Therefore, after passing through the band-elimination filter 1005a, the FM signal 1300 becomes an FM carrier 1034 by a level difference 1035 lower than the FM carrier 1031. Moreover, the sideband 1032 is not influenced by phase change or level fluctuation due to the band-elimination filter 1005a because the frequency of the sideband 1032 is separate from the FM carrier 1034 by $f_1$. Therefore, only the portion of the FM carrier 1034 is selectively suppressed by the level difference 1035 by the band-elimination filter 1005a. Thereby, the FM modulation factor of a signal narrow-band-FM-modulated by the FM modulator 1004a is apparently increased by the band-elimination filter 1005a because the level difference 1036 between a carrier and a sideband becomes smaller than the level difference 1033 before passing through the band-elimination filter 1005a.

Figure 8A:
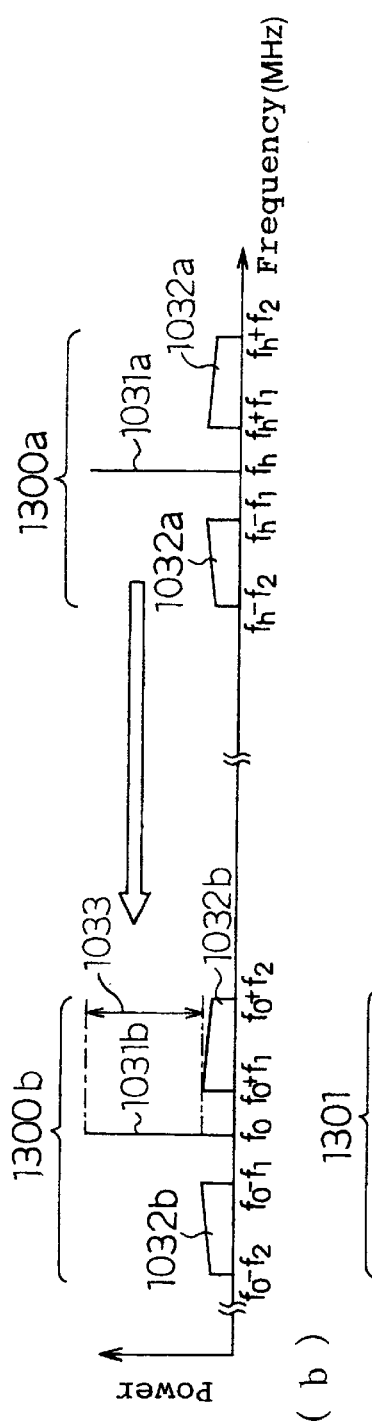
FIGS. 8(a) to 8(c) are frequency conversion diagrams for explaining functions of various portions of an FM signal in the third and fourth embodiments of the present invention.
Figure 8B:
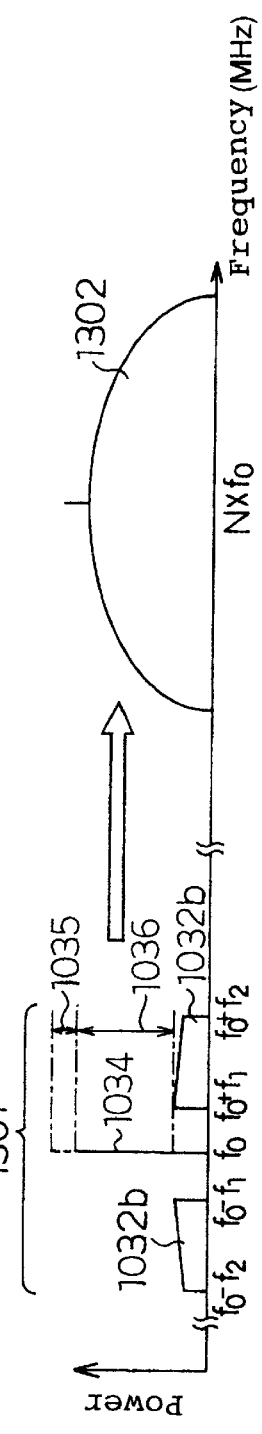
Figure 8C:
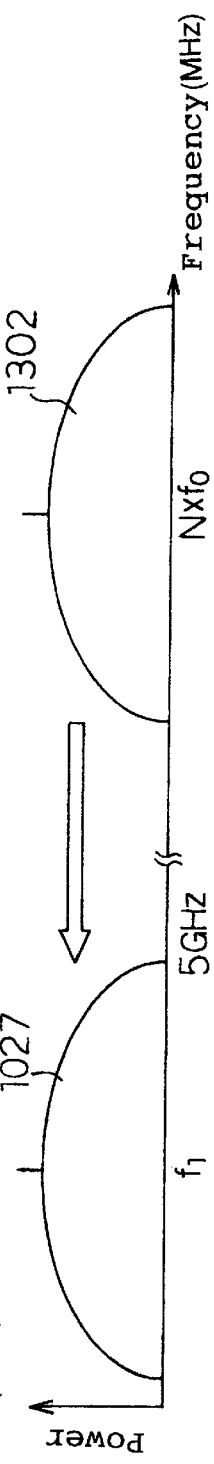

The signal 1301 is input to and multiplied by the multiplier 1006a by N to further increase the modulation factor and thereby, converted into an FM signal 1302 having an FM carrier (e.g. N×$f_0$=25 GHz) higher enough than the original AM signal as shown in FIG. 8(b). Therefore, it is possible to obtain the FM signal 1302 having a modulation factor for obtaining a C/N necessary required by an optical receiver for optical transmission through the above multiplication. Moreover, spectrums of unnecessary bands other than an FM signal band is eliminated by a band-pass filter 1007a and then, signal components are down-converted to the low frequency side by the frequency converter 1008a, for example, by a mixer. Thus, the FM-converted signal 1027 shown in FIG. 8(c) is obtained. The FM-converted signal 1027 is propagated through the wide-band amplifier 1009 as an optical signal by the semiconductor laser 1010.

Operations of the optical receiver 1019 are the same as those of the optical receiver 2 described for the embodiment 1 (see FIG. 1). This embodiment uses the delay-line type as shown in FIG. 6 and uses a two-output element 1016 serving as a high-speed digital element, an AND element 1017, and a delay circuit 1160. Moreover, the FM demodulator 1013 is not restricted to the above structure. It is also possible to use a double-tuned frequency discriminator, a Foster-Seeley discriminator, or a circuit such as a ratio detector having a frequency-discriminating function.

According to the above structure, by performing FM conversion with an FM modulator having a small FM modulation factor, primarily increasing the FM modulation factor with a band-elimination filter, and thereafter secondarily increasing the FM modulation factor, and thereby obtaining a desired FM modulation factor, it is possible to simultaneously convert AM multichannel signals subcarrier-multiplexed through the signal processing by a simple-structure electric circuit into FM signals without increasing multiplication number of the multiplier.

Fourth Embodiment

Figure 9:
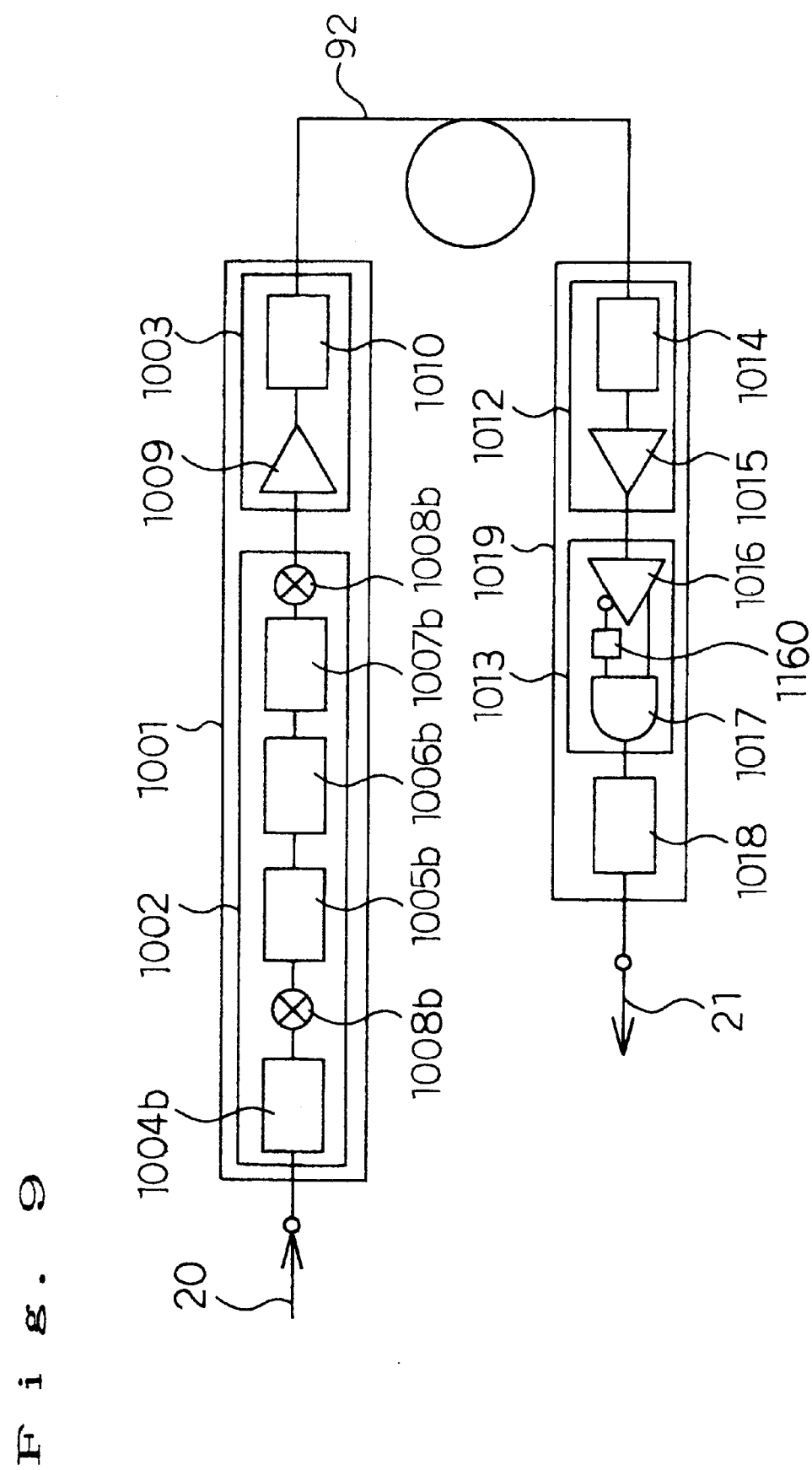
FIG. 9 is a block diagram of the FM signal optical transmission apparatus of the fourth embodiment of the present invention.

FIG. 9 is a block diagram showing the FM optical transmission system of an embodiment of the present invention. The structure of this embodiment is described below by referring to FIGS. 7 to 9.

In FIG. 9, an optical transmitter 1001 is constituted with an FM conversion section 1002 including an FM modulator 1004b, a frequency converter 1008b, a band-elimination filter 1005b, a multiplier 1006b, a band-pass filter 1007b, and a frequency converter 1008a and an electricity-to-light conversion section 1003 same as that of the embodiment 3.

Description of an optical receiver 1019 is omitted because the optical receiver 1019 is the same as that of the embodiment 3.

Operations of this embodiment having the above structure are described below.

That is, a multichannel subcarrier-multiplexed AM signal 20 is converted into the FM signal 1300a in FIG. 8(a) by the narrow-band FM modulator 1004b having an FM carrier (e.g. $f_h$=25 GHz) higher enough than the original AM signal frequency.

The narrow-band FM modulator 1004b performs the narrow-band FM modulation having a low modulation factor at which signal deteriorated due to a distortion does not occur or sidebands other than a first sideband 1032a do not remarkably appear as the FM conversion spectrum for each channel of a multichannel subcarrier-multiplexed signal. This signal is down-converted to the low-frequency side by the frequency converter 1008b to obtain a spectrum 1300b. In this case, it is assumed that the central frequency down-converted by the frequency converter 1008b is $f_0$ for the sake of description.

Hereafter, only an FM carrier 1031b is selectively suppressed by the level difference 1035 by the band-elimination filter 1005b to obtain the signal of the spectrum 1301 in FIG. 8(b). Subsequent operations are the same as those of the third embodiment.

Thus, this embodiment makes it possible to expand a frequency variable range and further expand the band of a signal input to an FM modulator by using an FM modulator having a high-enough carrier in addition to the advantages of the third embodiment.

It is preferable that the modulation factor of the FM modulator of each embodiment above described is 10% or less. When a modulation factor is 10% or less, it is possible to secure 98% of signal energy or more in a frequency zone from a frequency $f_0-f_2$ up to a frequency $f_0+f_2$ of the FM modulation spectrum 1300 of the multichannel subcarrier-multiplexed signal in FIG. 7(*b*) and realize narrow-band FM.

As described above, the above embodiments convert a plurality of subcarrier-multiplexed signals into FM signals by an FM modulator, suppress central-frequency components in the FM signals by a band-elimination filter, multiply the FM signals whose central frequency components are suppressed by a frequency multiplier, shift a signal having a desired modulation factor among the frequency-multiplied signals to an optical transmission band at the low-frequency side by a frequency converter, convert the signal into an optical signal, and transmit the optical signal.

Moreover, the above embodiments convert a plurality of subcarrier-multiplexed AM signals into FM signals with an FM modulator for generating a high-frequency carrier signal in a millimeter-wave band having a frequency higher enough than that of an AM signal serving as a non-modulated wave, shifts the FM signals to the low-frequency side with a frequency converter, suppress central frequency components of the shifted FM signals with a band-elimination filter, and apparently raised a desired modulation factor, and then multiply the signals with a frequency multiplier, shifts the frequency-multiplied signals having a desired modulation factor to the optical transmission band at the low-frequency side with a frequency converter, convert them into optical signals, and transmit the optical signals.

For the above embodiments, a structure is described which suppresses the central frequency component in an FM signal, then multiplies the FM signal whose central component is suppressed, and shift it to the low-frequency side. However, it is also possible to use a structure for only suppressing the central frequency component of an FM signal. In this case, a structure is constituted which converts a signal using a single subcarrier or a plurality of signals multiplexed by a plurality of subcarriers into an FM signal or FM signals by using FM modulation means, suppresses the central frequency component or components of the FM signal or FM signals, generates an optical signal or optical signals in accordance with the FM signal or FM signals whose central frequency component or components is or are suppressed, and transmits the optical signal or optical signals. Thereby, when directly converting an AM signal into an electric FM signal, it is possible to use a large modulation index for an FM modulator. Therefore, an advantage is obtained that a C/N value can be further improved by increasing a distortion with the FM modulator.

Moreover, in the case of the above embodiments, a band-suppression filter can use a filter for selectively suppressing a spectrum nearby the central frequency for FM conversion and the suppression degree can be approx. 10 dB.

Furthermore, for the above embodiments, a case is described in which suppression means of the present invention uses a band-elimination filter and the central frequency component of an FM signal shifted to the low-frequency side by first frequency conversion means (corresponding to the frequency converter 1008*b* in FIG. 9 in the case of the above embodiments) is suppressed. However, it is also possible to use a structure of suppressing the central frequency component of an FM signal converted by FM modulation means at the stage before the above shifting is performed and then, shifting the FM signal to the low-frequency side similarly to the above case. The structure in the above case is described below. That is, a plurality of subcarrier-multiplexed AM signals are converted into FM signals by an FM modulator having an FM carrier in a millimeter band having a carrier frequency higher enough than that of the AM signals serving as non-modulated waves, the central frequency components of the FM signals are suppressed with the band-elimination filter, a desired modulation factor is apparently raised, and then the signals are shifted to the low-frequency side by a first frequency converter, multiplied by a frequency multiplier, shifted to the optical transmission band at the low-frequency side by a second frequency converter, converted into optical signals, and transmitted. A block diagram in the above case is the same as a block diagram in which the sequence of the arrangement of the frequency-elimination filter 1005*b* and the frequency converter 1008*b* is reversed.

Moreover, for the above embodiments, a case is mainly described in which a plurality of subcarrier-multiplexed signals, that is, multichannel signals multiplexed by a plurality of subcarriers are converted into FM signals by FM modulation means. However, it is also possible to use a single-channel signal using a single subcarrier as a signal to be converted into an FM signal. Also in this case, the advantages same as the above mentioned can be obtained.

Fifth Embodiment

Figure 10:
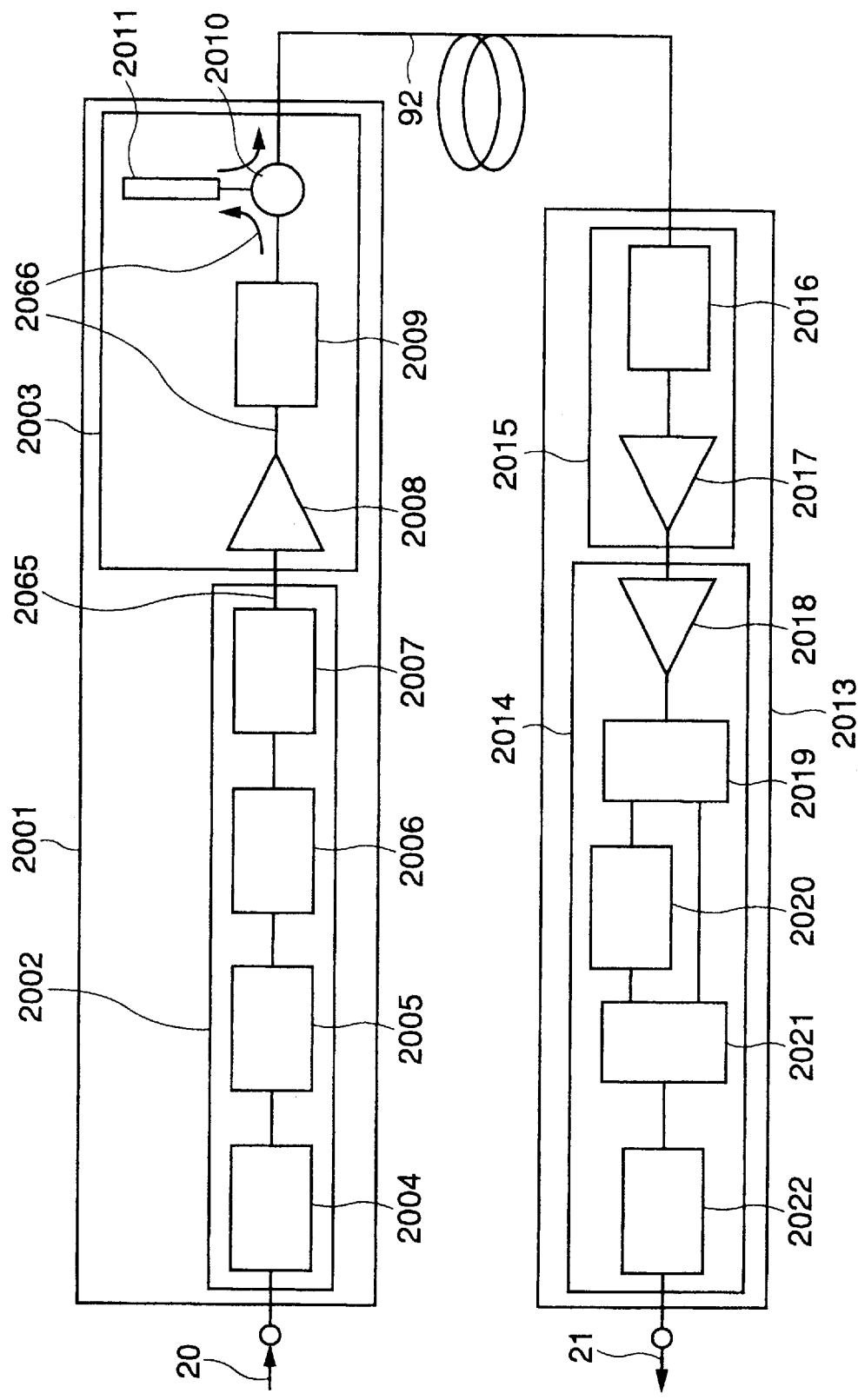
FIG. 10 is a block diagram showing the structure of the FM optical transmission system of the fifth embodiment of the present invention.

FIG. 10 is a block diagram showing the structure of the FM optical transmission system of the fifth embodiment of the present invention. The structure of this embodiment is described below by referring to FIG. 10.

As shown in FIG. 10, the present FM optical transmission system is provided with an optical transmitter 2001 and an optical receiver 2013, in which the optical transmitter 2001 and the optical receiver 2013 are connected each other by an optical-fiber cable 92. The optical transmitter 2001 is provided with an AM-to-FM conversion section 2002 and an electricity-to-light conversion section 2003. The AM-to-FM conversion section 2002 is provided with an AM-to-FM converter 2004, a multiplier 2005, a band-pass filter 2006, and a frequency converter 2007. The electricity-to-light conversion section 2003 is provided with a wide-band amplifier 2008, a semiconductor laser 2009, an optical-fiber grating 2011, and an optical circulator 2010.

The present FM optical transmission system has a structure almost the same as that of the above-described embodiments but it is characterized by including the optical-fiber grating 2011.

Figure 12A:
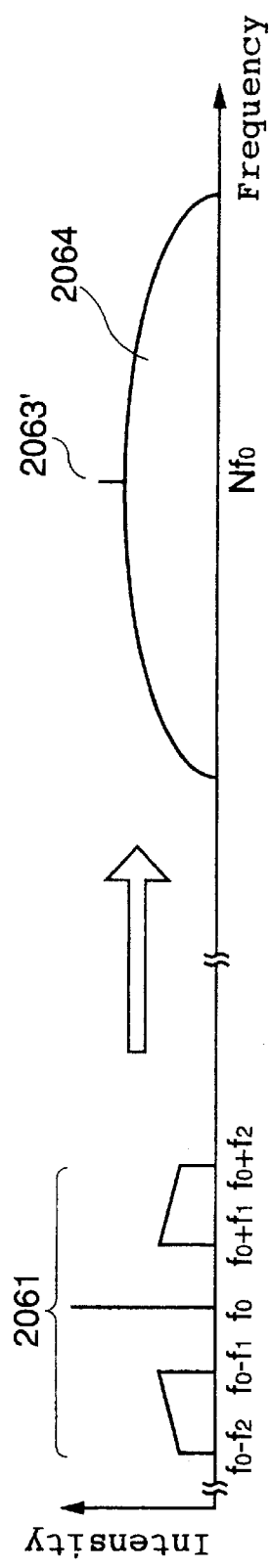
FIGS. 12(a) and 12(b) are frequency conversion diagrams for explaining the functions of various portions of an FM signal in the present invention.
Figure 12B:
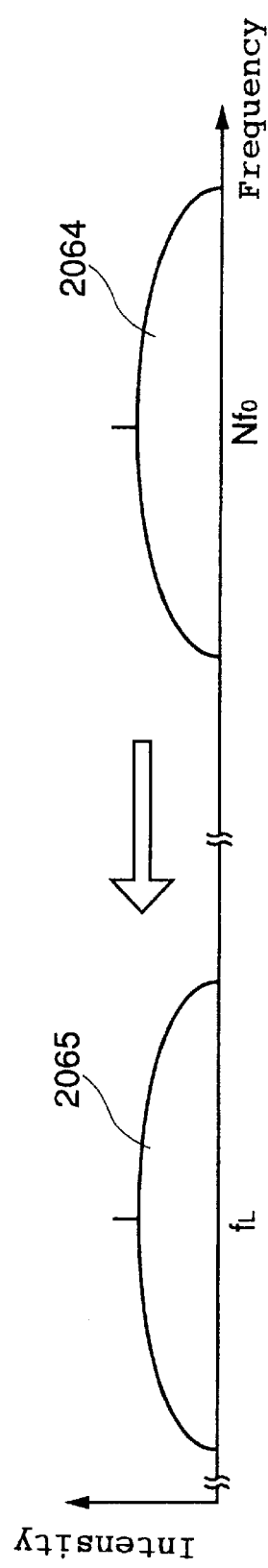
Figure 13:
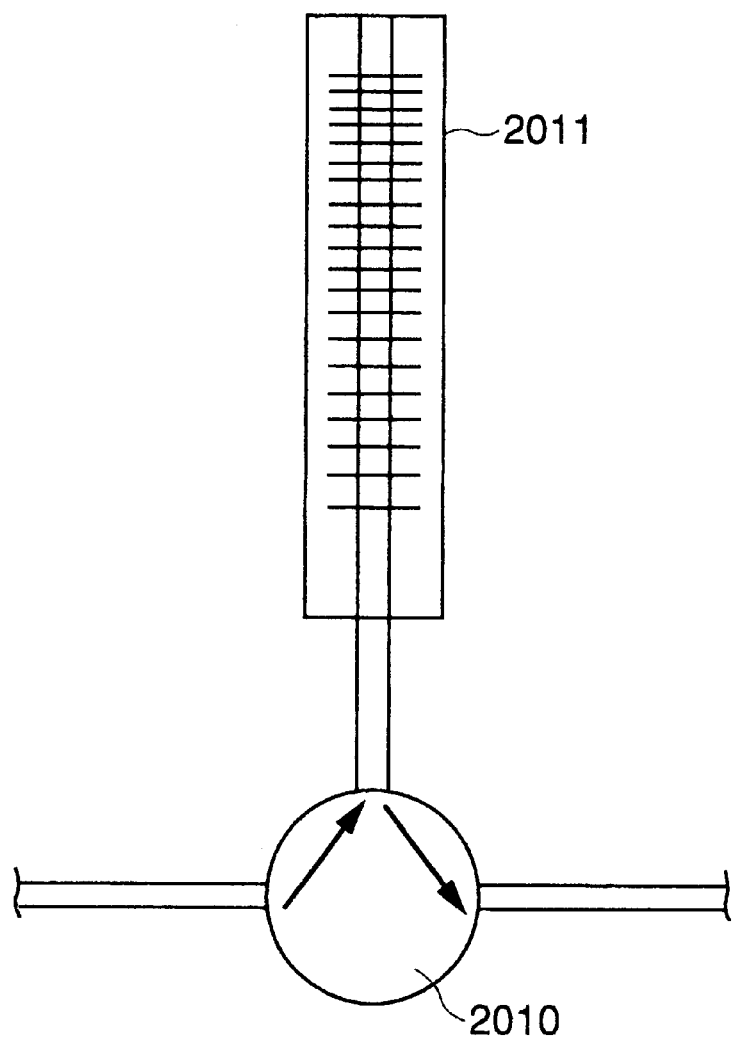
FIG. 13 is an illustration showing the structure of group-delay compensation means using the optical fiber grating of the fifth embodiment of the present invention.

FIGS. 11(*a*) and 11(*b*) and FIGS. 12(*a*) and 12(*b*) are conceptual views of signal spectrums for explaining operations of the FM optical transmission system, FIG. 13 is a block diagram of group-delay compensation means constituted with the optical-fiber grating 2011, and FIGS. 14(*a*) to 14(*c*) are conceptual views showing operations of the optical-fiber grating 2011.

Then, operations of the optical-fiber grating 2011 of this embodiment are mainly described by referring to FIGS. 11 to 14.

The contents shown in FIGS. 11(*a*) to 12(*b*) are basically the same as those described for the above embodiments. That is, in FIGS. 11(*a*) and 11(*b*), symbol 20 denotes the original AM signal (band of $f_1$ to $f_2$) above described, 2061 denotes an FM signal converted by the AM-to-FM converter 2004. Symbol 2062 denotes a first sideband in the spectrum of the FM signal 2061, which appears in regions $f_1$ separate from each other centering around an FM carrier 2063 (frequency $f_0$). Moreover, symbol 2064 in FIGS. 12(*a*) and 12(*b*) denotes an FM-multiplied signal having a carrier 2063' obtained by multiplying the FM signal 2061 by N by the multiplier 2005 and a wide signal band. The carrier 2063' has a frequency for example, $NF_0(NXf_0)=25$ GHz that is higher enough than that of the original AM signal 20.

That is, an FM-frequency-converted signal 2065 obtained in the same manner as the case of the above embodiments is input to the semiconductor laser 2009 through the wide-band amplifier 2008 and converted into an FM optical signal 2066 by the semiconductor laser 2009. Then, the generated FM optical signal 2066 is input to the optical-fiber grating 2011 through the optical circulator 2010.

The optical-fiber grating 2011 is constituted so as to be able to optionally set the group-delay characteristic in an optical signal reflected by the optical-fiber grating 2011 by changing intervals between refraction-factor distributions in the longitudinal direction as shown in FIG. 13.

Figure 14A:
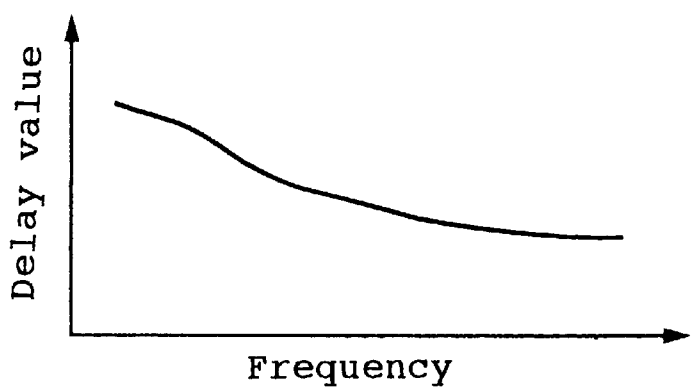
FIGS. 14(a) to 14(c) are conceptual views of group-delay characteristics of the transmission system of the fifth embodiment.

FIG. 14(a) shows an example of the group-delay characteristic of the FM optical signal 2066 when not passing the signal 2066 through the optical-fiber grating 2011. After the FM optical signal 2066 passes through the optical transmitter 2001 and the optical fiber 92, the group-delay characteristic becomes uneven depending on a frequency. In the case of the example shown in FIG. 14(a), a delay value decreases as a frequency gets higher.

Figure 14B:
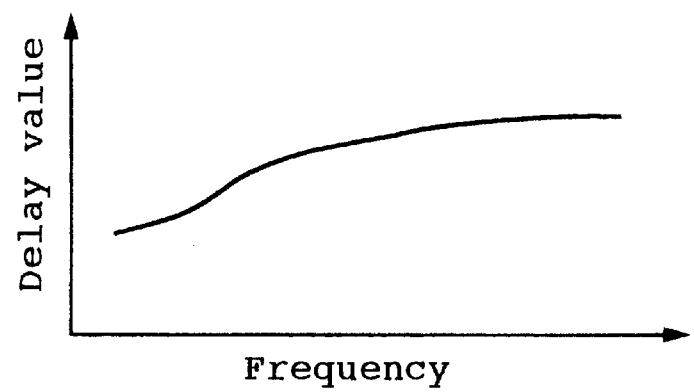
Figure 14C:
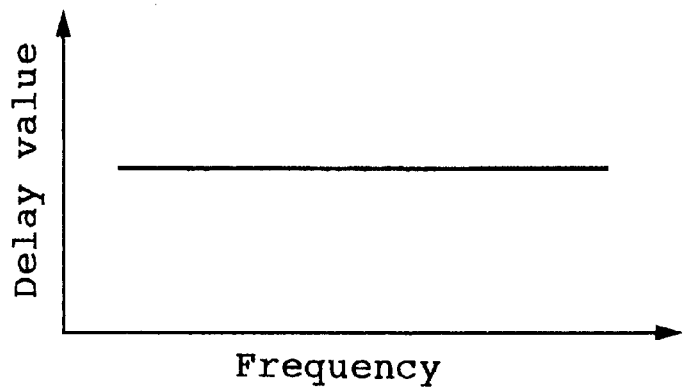

On the contrary, the delay-adjustment value of the above optical-fiber grating 2011 is set so as to be opposite to the group-delay characteristic in FIG. 14(a) as shown in FIG. 14(b). Thereby, the group-delay characteristic shown in FIG. 14(a) and the group-delay adjustment value shown in FIG. 14(b) are offset and the group-delay characteristic is uniformed as shown in FIG. 14(c) independently of a frequency.

The FM optical signal 2066 whose group-delay characteristic is adjusted by the action of the optical-fiber grating 2011 is transmitted to the optical-fiber cable 92 through the optical circulator 2010.

Moreover, the FM optical signal 2066 input to the optical receiver 2013 from the optical-fiber cable 92 is converted into an electric signal by a light-to-electricity conversion section 2015 (constituted with a light-to-electricity converter 2016 including a photodiode or avalanche photodiode and a preamplifier 2017) and then, input to an FM-to-AM demodulator 2014 (constituted with a limiter amplifier 2018, a branch element 2019, a delay circuit 2020, a mixer 2021, and a low-pass filter 2022) in which the signal 2066 is amplified to a desired signal intensity and demodulated to the original AM signal 21. The demodulated AM signal 20 is a signal having a preferable phase characteristic because the group delays in a transmission system are offset by the optical-fiber grating 2011.

According to the above structure, it is possible to obtain a desired FM modulation factor by using the AM-to-FM converter 2004 having a small FM modulation factor, thereby performing AM-to-FM conversion, and secondarily increasing the FM modulation factor in accordance with the subsequent multiplying operation. Thereby, it is possible to simultaneously convert AM multichannel signals subcarrier-multiplexed through the signal processing by a simple-structure electric circuit into FM signals without increasing multiplication number of the multiplier 2005 and moreover, demodulate the group delays in a modulation-demodulation system and a transmission system by group-delay compensation means constituted with the optical-fiber grating 2011 and the optical circulator 2010 to the AM signal 21 superior in phase characteristic.

Moreover, in general, the group-delay characteristic shown in FIG. 14(a) is approx. tens to hundred-and-tens psec in a predetermined band. Therefore, a group-delay value compensated by the optical-fiber grating 2011 can be obtained by forming a refraction-factor distribution at the hundreds-psec/nm order in a negative phase by the optical-fiber grating 2011 so as to obtain the compensation characteristic in FIG. 14(b) when considering the wavelength expansion (several to more-than-ten GHz) of the semiconductor laser 2009.

By executing the above group-delay compensating function and thereby performing group-delay compensation by the entire transmission system, it is possible to constitute an FM optical transmission system superior in group-delay characteristic as a whole even if using an inexpensive circuit element not always having a preferable group-delay characteristic. Thereby, it is possible to cut the cost and realize a structure to be easily introduced into an access network including a subscriber's system.

Sixth Embodiment

Figure 15:
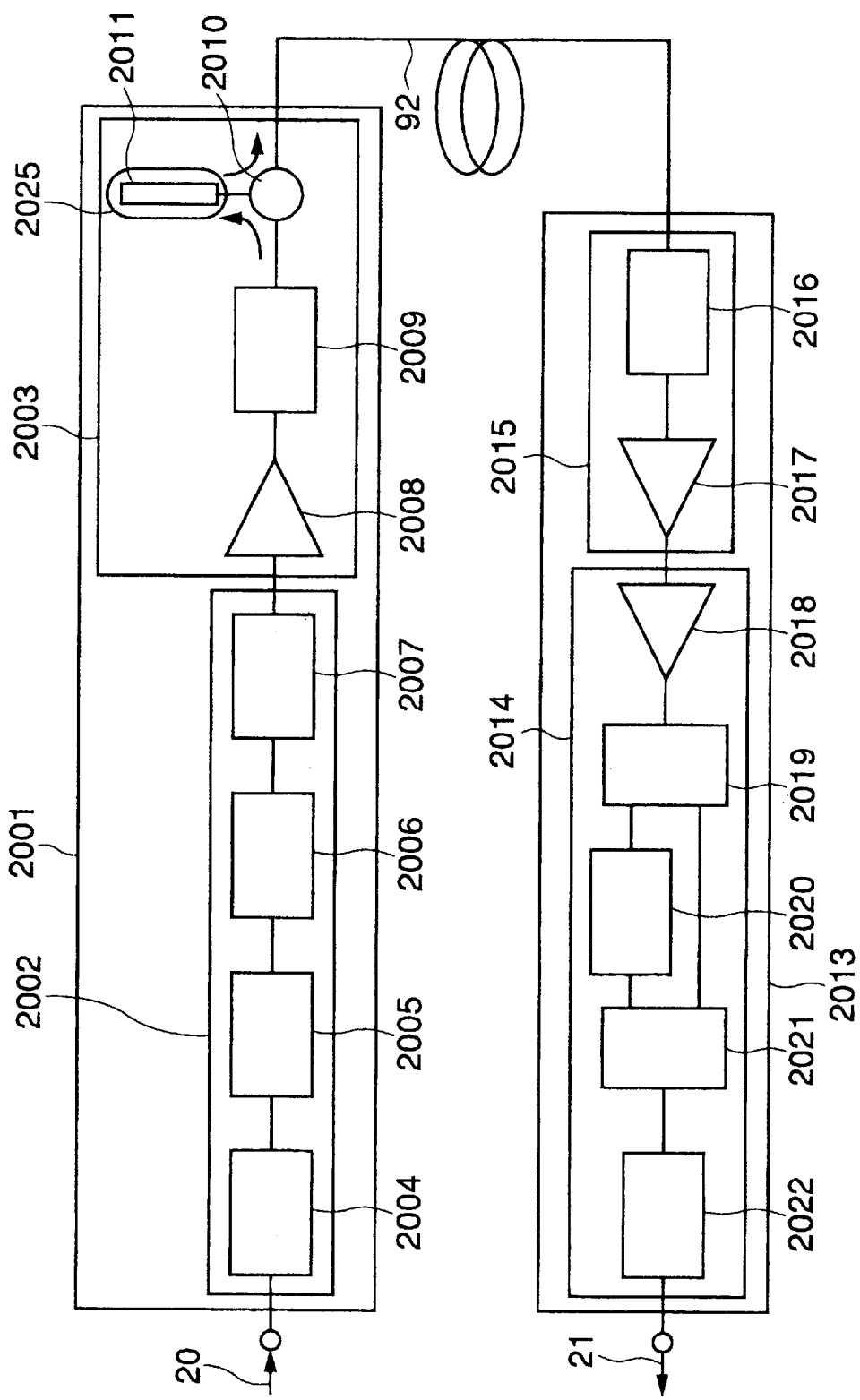
FIG. 15 is a block diagram showing the structure of the FM optical transmission system of the sixth embodiment of the present invention.

FIG. 15 is a block diagram showing the structure of the FM optical transmission system of the sixth embodiment of the present invention. The FM optical transmission system is basically provided with a structure same as that of the FM optical transmission system of the fifth embodiment, in which the same or a similar structure is provided with the same symbol and its description is omitted.

The FM optical transmission system is characterized in that the optical-fiber grating 2011 is provided with a temperature control section 2025. The temperature control section 2025 has a structure including a heater and a thermostat to optionally change the environmental temperatures of the optical-fiber grating 2011 so as to be able to change the longitudinal dimensions of the optical-fiber grating 2011 by fluctuating environmental temperatures and thereby, adjusting the linear expansion of the optical-fiber grating 2011. By changing longitudinal dimensions of the optical-fiber grating 2011, it is possible to change intervals between refraction-factor distributions of the optical-fiber grating 2011.

For each of the above embodiments, the optical-fiber grating 2011 is used as a group-delay compensating element. However, when group-delay characteristics of a transmission system linearly change, it is needless to say that a dispersion compensating fiber can be used. Moreover, in the case of each of the above embodiments, the present invention is executed for an FM optical transmission system for transmitting a plurality of subcarrier-multiplexed signals after applying such processings as FM modulation, multiplication, low-frequency conversion, optical signal conversion to the signals in order. However, the present invention is not restricted to the above FM optical transmission system. It is needless to say that the present invention can be executed for FM optical transmission systems having any structure as long as they are respectively provided with an optical transmitter for transmitting a plurality of subcarrier-multiplexed signals by simultaneously converting them into FM optical signals.

By using the above structure (temperature control section 2025), it is possible to change group-delay compensation characteristics caused by the optical-fiber grating 2011 in addition to the advantages of the embodiment 5 and finely adjust the degree of group-delay compensation in accordance with the fluctuation of transmission delay on a system. Moreover, it is possible to prevent the degree of dispersion compensation from being fluctuated due to the fluctuation of the set environmental temperature of the optical-fiber grating 2011.

In the case of this embodiment, the temperature control section 2025 is provided f or the optical-fiber grating 2011. However, it is also possible to obtain the same operation/working effect by changing longitudinal tensions of a fiber.

Moreover, when the optical-fiber grating 2011 has a function for local heating and cooling or a function for changing tensions in a certain range of the refraction-factor distribution, it is possible to change group-delay compensation characteristics of only a predetermined frequency band.

Seventh Embodiment

Figure 16:
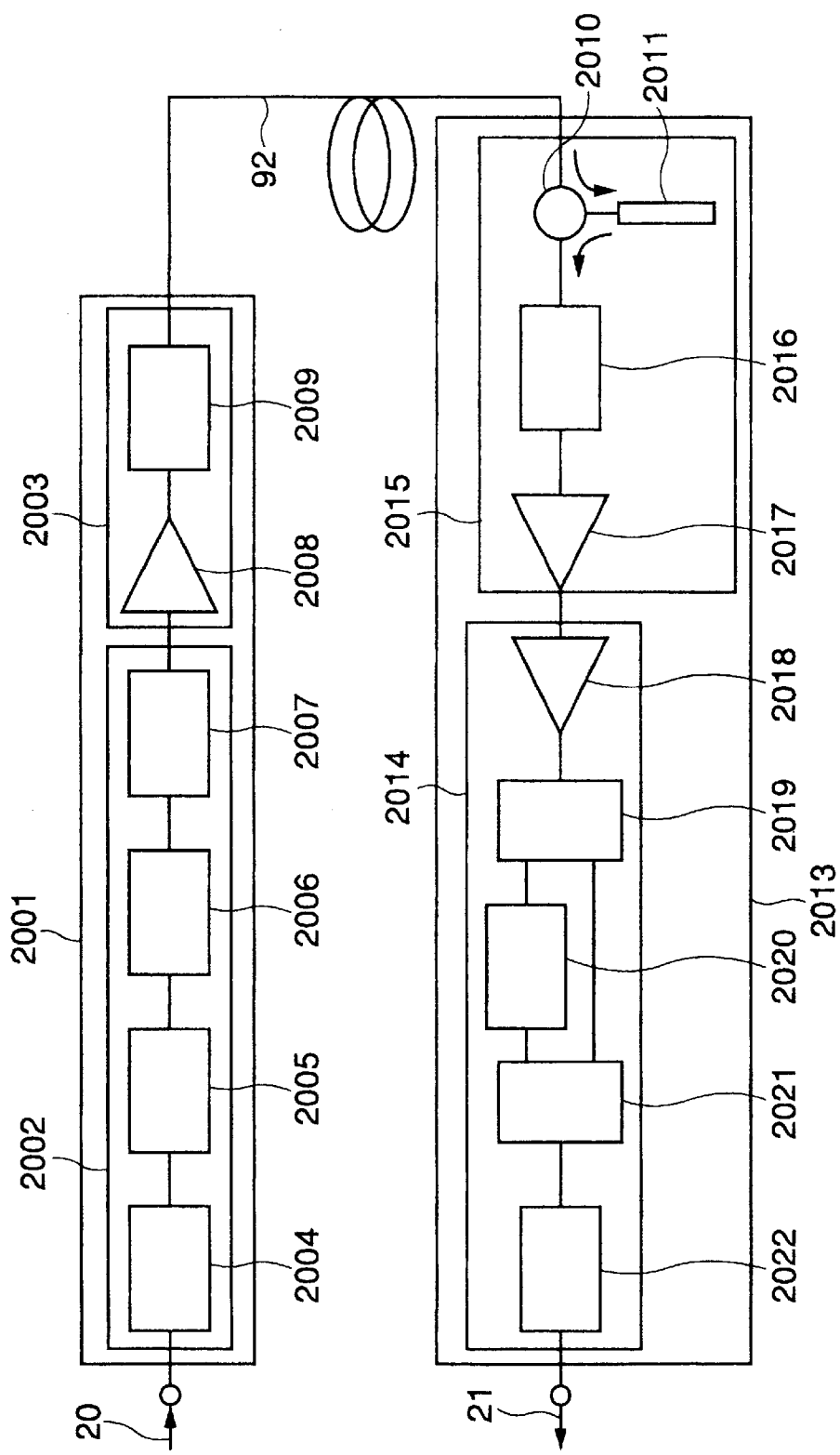
FIG. 16 is a block diagram sowing the structure of the FM optical transmission system of the seventh embodiment of the present invention.

FIG. 16 is a block diagram of the FM optical transmission system of the seventh embodiment of the present invention.

This FM optical transmission system is basically provided with the same structure as the embodiment 5. In FIG. 16, the same or similar portions are provided with the same symbol and their description is omitted.

This FM optical transmission system is characterized in that the optical-fiber grating 2011 and optical circulator 2010 are provided for the light-to-electricity conversion section 2015 in the optical receiver 2013. By using the above structure, it is possible to further compensate the group-delay dispersion (phase shift) caused by the optical-fiber cable 92 and optical receiver 2013 in addition to the advantages of the embodiment 5. Each of the frequency multipliers of the above embodiments raises an input frequency to n-fold frequency and generates a high frequency by using the nonlinearity of transistor, FET or a variable-capacity diode.

Moreover, each of the frequency converters of the above embodiments converts a frequency into the high-frequency side or low-frequency side by using the frequency mixing action of a nonlinear circuit element similarly to the case of a frequency multiplier.

Figure 17:
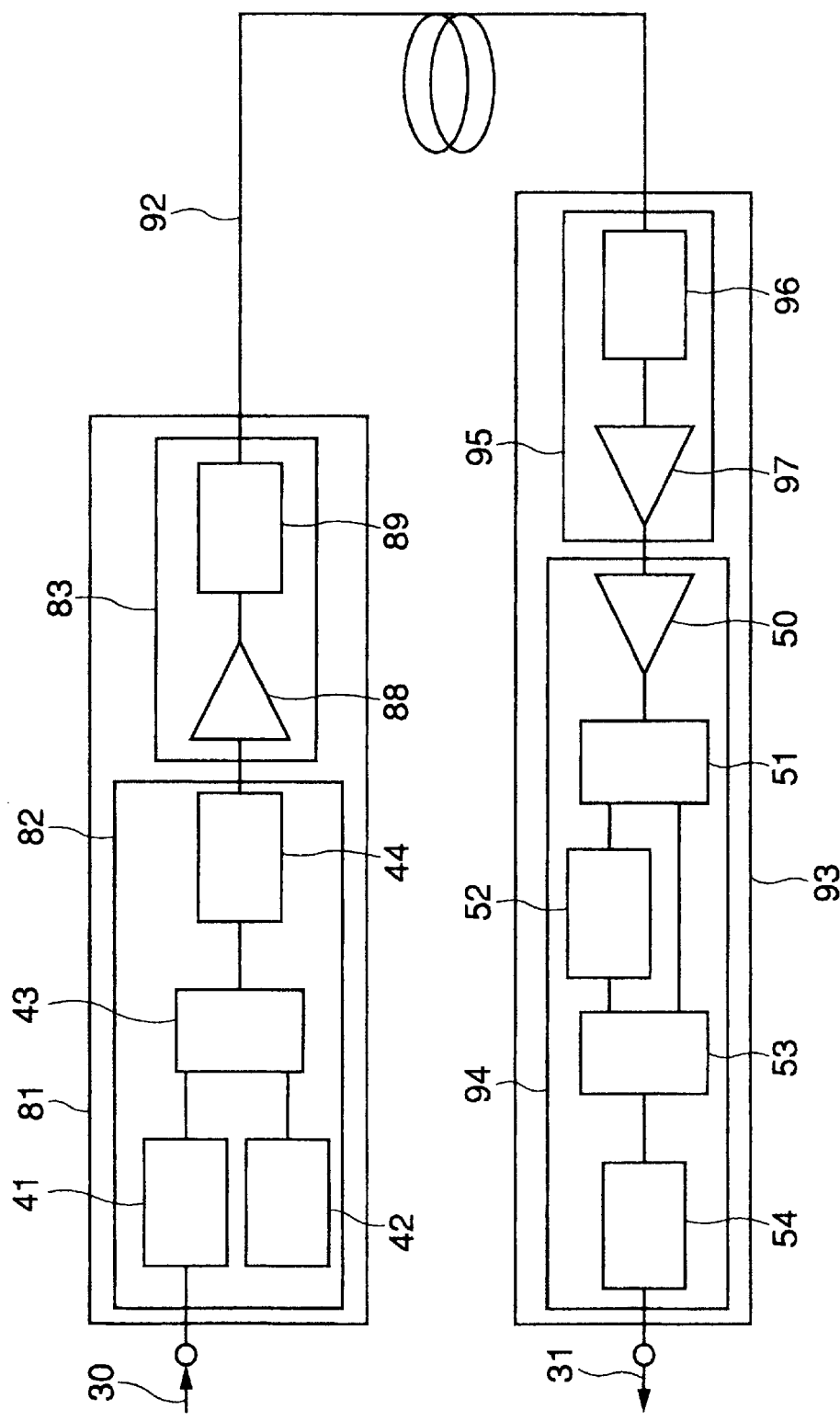
FIG. 17 is a block diagram showing the entire structure of the FM optical transmission system of a conventional example.

For the above embodiments, a case is described in which compensation means is provided for an optical transmission system having one semiconductor laser as described above. However, it is also possible to provide the compensation means for the transmission side or reception side of the conventional FM optical transmission system described for FIG. 17.

What is claimed is:

1. An FM signal optical transmission apparatus comprising:

modulation means for converting a multiple signal obtained by subcarrier-multiplexing a plurality of signals into an FM signal having a predetermined carrier frequency;

frequency conversion means for shifting an FM signal converted by said modulation means to a frequency lower than said carrier frequency; and optical modulation means for converting an optical signal into an FM optical signal by modulating said optical signal in accordance with an FM signal output from said frequency conversion means and transmitting said FM optical signal through an optical fiber cable, wherein said carrier frequency is higher enough than the frequency of said signals, conversion to said FM signal represents conversion of the carrier signal having said carrier frequency into a narrow-band FM signal by substantially FM modulating said carrier signal in accordance with a modulation index for substantially generating only a first-sideband, and shifting of said narrow-band FM signal to said low frequency side represents conversion of said narrow-band FM signal into a low-frequency-conversion narrow-band FM signal having a frequency lower enough than said carrier frequency.

2. The FM signal optical transmission apparatus according to claim 1, further comprising:

multiplication means for multiplying a plurality of said FM signals output from said modulation means to output a multiplied signal; and first-band filtering means for band-filtering a desired narrow-band FM signal among multiplied signals output from said multiplication means to output it to said frequency conversion means.

3. The FM signal optical transmission apparatus according to claim 1, further comprising:

band filtering means for band-filtering only either of a first upper-sideband and a first lower-sideband included in the first sideband of said FM signal output from said modulation means.

4. The FM signal optical transmission apparatus according to claim 1, wherein said modulation means is a voltage-control oscillator or relaxation oscillator.

5. The FM signal optical transmission apparatus according to claim 1, wherein said modulation means phase-modulates said multiple signal to convert it into a phase-modulated signal and thereafter, multiplexes the phase-modulated signal and said carrier signal and thereby, converts the multiplexed signal into a narrow-band FM signal to output it.

6. The FM signal optical transmission apparatus according to claim 1, wherein suppression means for suppressing the central frequency of said FM signal output from said modulation means is included, and the output from said suppression means is input to said frequency conversion means to serve as an object of said shifting.

7. The FM signal optical transmission apparatus according to claim 6, wherein said suppression means is a band-elimination filter and either of the upper sideband and lower sideband of an FM signal after passing through said band-elimination filter is transmitted as said FM optical signal.

8. The FM signal optical transmission apparatus according to claim 1, wherein compensation means is included which applies dispersion compensation or group-delay compensation to said FM signal to be transmitted.

9. The FM signal optical transmission apparatus according to claim 8, wherein said compensation means compensates the negative-phase characteristic of the group delay of said FM signal caused in an electric-circuit section in said FM signal optical transmission apparatus and/or said optical fiber.

10. The FM signal optical transmission apparatus according to claim 8, wherein said compensation means is an optical-fiber grating.

11. The FM signal optical transmission apparatus according to claim 10, wherein a control section is included which controls the compensation characteristic of said optical-fiber grating.

12. The FM signal optical transmission apparatus according to claim 10, wherein a tension control section is included which controls the tension of an optical fiber constituting said optical-fiber grating.

13. The FM signal optical transmission apparatus according to claim 8, wherein said compensation means is a dispersion-compensating fiber.

* * * * *